United States Patent
Naoi et al.

(10) Patent No.: US 9,296,623 B2
(45) Date of Patent: Mar. 29, 2016

(54) LITHIUM TITANATE NANOPARTICLES, COMPOSITE OF LITHIUM TITANATE NANOPARTICLES AND CARBON, METHOD OF PRODUCTION THEREOF, ELECTRODE MATERIAL CONSISTING OF SAID COMPOSITE, ELECTRODE, ELECTROCHEMICAL ELEMENT, AND ELECTROCHEMICAL CAPACITOR EMPLOYING SAID ELECTRODE MATERIAL

(75) Inventors: Katsuhiko Naoi, Tokyo (JP); Wako Naoi, Tokyo (JP); Shuichi Ishimoto, Tokyo (JP); Kenji Tamamitsu, Tokyo (JP)

(73) Assignee: NIPPON CHEMI-CON CORPORATION, Toyko (JP)

( * ) Notice: Subject to any disclaimer, the term of this patent is extended or adjusted under 35 U.S.C. 154(b) by 500 days.

(21) Appl. No.: 13/638,520
(22) PCT Filed: Mar. 31, 2011
(86) PCT No.: PCT/JP2011/001962
    § 371 (c)(1),
    (2), (4) Date: Nov. 27, 2012
(87) PCT Pub. No.: WO2011/122046
    PCT Pub. Date: Oct. 6, 2011

(65) Prior Publication Data
US 2013/0063867 A1    Mar. 14, 2013

(30) Foreign Application Priority Data

Mar. 31, 2010 (JP) ................ 2010-084632
Mar. 31, 2010 (JP) ................ 2010-084703
Mar. 31, 2010 (JP) ................ 2010-084704
Mar. 31, 2010 (JP) ................ 2010-084705
Mar. 31, 2010 (JP) ................ 2010-084706

(51) Int. Cl.
    *H01G 9/145*     (2006.01)
    *C01G 23/00*     (2006.01)
    (Continued)

(52) U.S. Cl.
    CPC .............. *C01G 23/005* (2013.01); *B82Y 30/00* (2013.01); *H01G 11/06* (2013.01); *H01G 11/30* (2013.01);
    (Continued)

(58) Field of Classification Search
    CPC ....................................................... C01G 23/04
    USPC ................................................... 361/503
    See application file for complete search history.

(56) References Cited

U.S. PATENT DOCUMENTS

| 2001/0031401 | A1  | 10/2001 | Yamawaki et al. |
| 2007/0238023 | A1* | 10/2007 | Gorshkov ............ C01G 23/005 |
|              |     |         | 429/231.1 |
| 2010/0025627 | A1  | 2/2010  | Naoi et al. |

FOREIGN PATENT DOCUMENTS

| CN | 101630732  | 1/2010 |
| JP | 60-260425  | 12/1985 |

(Continued)

OTHER PUBLICATIONS

Japanese Application No. 2010-084632 Office Action dated Aug. 5, 2014, 7 pages including English translation.
(Continued)

*Primary Examiner* — Jenny L Wagner
*Assistant Examiner* — Michael P McFadden

(57) ABSTRACT

A mixed solvent is prepared by dissolving acetic acid and lithium acetate in a mixture of isopropanol and water. This mixed solvent together with titanium alkoxide and carbon nanofiber (CNF) were introduced into a rotary reactor, the inner tube was rotated at a centrifugal force of 66,000 N $(kgms^{-2})$ for 5 minutes to form a thin film of the reactant on the inner wall of the outer tube, and sheer stress and centrifugal force were applied to the reactant to allow promotion of chemical reaction, yielding CNF on which highly dispersed lithium titanate nanoparticle precursors are supported. The obtained composite powder was heated under nitrogen atmosphere at 900° C. for 3 minutes, yielding a composite powder in which highly dispersed lithium titanate nanoparticles are supported on CNF, wherein crystallization of lithium titanate was allowed to progress.

5 Claims, 7 Drawing Sheets

(51) Int. Cl.
*B82Y 30/00* (2011.01)
*H01M 4/485* (2010.01)
*H01G 11/06* (2013.01)
*H01G 11/50* (2013.01)
*H01G 11/30* (2013.01)
*H01G 11/32* (2013.01)
*H01M 10/0525* (2010.01)

(52) U.S. Cl.
CPC ............... *H01G 11/32* (2013.01); *H01G 11/50* (2013.01); *H01M 4/485* (2013.01); *C01P 2002/85* (2013.01); *C01P 2004/04* (2013.01); *C01P 2004/64* (2013.01); *C01P 2004/80* (2013.01); *H01M 10/0525* (2013.01); *Y02E 60/122* (2013.01); *Y02E 60/13* (2013.01); *Y02P 70/54* (2015.11)

(56) References Cited

FOREIGN PATENT DOCUMENTS

| | | |
|---|---|---|
| JP | 61-031316 | 2/1986 |
| JP | 2006-032321 | 2/2006 |
| JP | 2006032321 | 2/2006 |
| JP | 2006-221881 | 8/2006 |
| JP | 2007-160151 | 6/2007 |
| JP | 2008-270795 | 11/2008 |
| JP | 2011-001254 | 1/2011 |
| JP | 2011216749 | 10/2011 |
| WO | 2008/088832 | 7/2008 |
| WO | 2009/140501 | 11/2009 |
| WO | 2010/137582 | 12/2010 |

OTHER PUBLICATIONS

Naoi, Katsuhiko et al., "High-rate nano-crystalline Li4Ti5O12 attached on carbon nano-fibers for hybrid supercapacitors," Journal of Power Sources, 2010, pp. 6250-6254.
European Application No. 11762288.6 Extended Search Report dated Feb. 16, 2015, 6 pages.
Huang, Junjie et al., "The Preparation and Characterization of $Li_4Ti_5O_{12}$/Carbon Nano-tubes for Lithium Ion Battery," Electrochimica Acta Journal, May 2008, pp. 7756-7759.
Katsuhiko Naoi, et al.; "High-rate nano-crystalline Li4T5O12 attached on carbon nano-fibers for hybrid supercapacitors"; Journal of Power Sources, Sep. 15, 2010; vol. 195, No. 18, pp. 6250-6254.
Liang Chen et al.; General synthesis of carbon-coated nanostructure Li4Ti5O12 as a high rate electrode material for Li-ion intercalation, Journal of Materials Chemistry, Jan. 21, 2010, vol. 20, No. 3, pp. 595-602.
Daisuke Endo et al.; "Improvement of High Rate Discharge Performance for Lithium-ion Battery with Lithium Titanium Oxide Negative Active Material", GS Yuasa Technical Report, Dec. 2007; vol. 4, No. 2, pp. 36-40.
Chunhai Jiang et al., "Preparation and rate capacity of Li4Ti5O12 hollow-sphere anode material", Journal of Power Sources, Apr. 15, 2007, vol. 166, No. 2, pp. 514-518.
Kyu-Sung Park et al., "Nitradation-Driven Conductive Li4Ti5O12 for Lithium Ion Batteries", Journal of the American Chemical Society, Oct. 15, 2008, vol. 130, No. 45, pp. 14930-14931.
Japanese Application No. 2010-084632 Office Action dated Apr. 13, 2015, 8 pages w/English translation.

\* cited by examiner

LITHIUM TITANATE NANOPARTICLES, COMPOSITE OF LITHIUM TITANATE NANOPARTICLES AND CARBON, METHOD OF PRODUCTION THEREOF, ELECTRODE MATERIAL CONSISTING OF SAID COMPOSITE, ELECTRODE, ELECTROCHEMICAL ELEMENT, AND ELECTROCHEMICAL CAPACITOR EMPLOYING SAID ELECTRODE MATERIAL

TECHNICAL FIELD

The present invention relates to lithium titanate nanoparticles, a composite of lithium titanate nanoparticles and carbon and a method of production thereof, an electrode material consisting of this composite, an electrode and an electrochemical element and an electrochemical capacitor that employ this electrode material.

BACKGROUND ART

A carbon material etc. that stores and releases lithium is currently used as the electrode for lithium batteries, but there is a risk of decomposition of the electrolytic solution since the negative potential is lower than the reductive decomposition potential of hydrogen. Accordingly, as described in Patent Documents 1 or 2, the use of lithium titanate having higher negative potential than the reductive decomposition potential of hydrogen is being investigated, but lithium titanate has a problem of low output property. Accordingly, attempts are being made to improve output property by an electrode in which lithium titanate is made into nanoparticles and supported on carbon.

Patent Document 1: JP 2007-160151 A
Patent Document 2: JP 2008-270795 A

The inventions described in these Patent Documents are methods for applying sheer stress and centrifugal force to a reactant in a rotating reactor to allow promotion of chemical reaction (generally referred to as mechanochemical reaction), thereby yielding dispersed lithium titanate supported on carbon. In this case, for example, titanium alkoxide and lithium acetate which are the starting materials of lithium titanate, a carbon such as carbon nanotube or Ketjen Black, and acetic acid etc. are used as reactants.

Although the electrodes that use carbon supporting lithium titanate nanoparticles described in these Patent Documents exert superior output property, there are recent demands to further improve the output property and to improve the electric conductivity in this type of electrode.

The present invention is proposed to solve the problems of the conventional technology as stated above, the object of which is to provide lithium titanate nanoparticles that enable the output property and electric conductivity to be improved when the electrode is configured by doping oxygen vacancy (also called oxygen defect) portions with nitrogen, a composite of lithium titanate nanoparticles and carbon, and a method of production thereof. In addition, other objects of the present invention is to provide an electrode material that employs said composite, an electrode, an electrochemical element, and an electrochemical capacitor that employ this electrode material.

SUMMARY OF THE INVENTION

In order to achieve the said object, the lithium titanate nanoparticles of the present invention are produced by applying sheer stress and centrifugal force to a solution comprising titanium alkoxide and lithium acetate as well as carbon particles in a rotating reactor to allow reaction and production of carbon supporting dispersed lithium titanate nanoparticle precursors, heating this carbon supporting dispersed lithium titanate nanoparticle precursors under nitrogen atmosphere to generate oxygen vacancies in lithium titanate by the reducing action of carbon, and doping these oxygen vacancy sites with nitrogen. A composite material consisting of lithium titanate nanoparticles having these oxygen vacancies and doped with nitrogen together with carbon supporting the highly dispersed particles, an electrode that uses this composite material, an electrochemical element and an electrochemical capacitor that employ this electrode, as well as the fact that the carbon configuring the composite is a building block for graphite fragment are also aspects of the present invention.

The method for producing the lithium titanate nanoparticles of the present invention comprises the steps of: applying sheer stress and centrifugal force to the reactant to allow promotion of chemical reaction by reacting titanium alkoxide and lithium acetate together with a solvent in a rotating reactor to produce lithium titanate nanoparticle precursors; and heating these lithium titanate nanoparticle precursors under nitrogen atmosphere.

The method for producing the composite of lithium titanate nanoparticles and carbon of the present invention comprises the steps of: applying sheer stress and centrifugal force to a solution comprising titanium alkoxide and lithium acetate as well as carbon particles in a rotating reactor to allow reaction and production of carbon supporting dispersed lithium titanate nanoparticle precursors; and heating this carbon supporting dispersed lithium titanate nanoparticle precursors under nitrogen atmosphere.

In the method for producing the lithium titanate nanoparticles, or the method for producing a composite of lithium titanate nanoparticles and carbon, it is also one aspect of the present invention to apply sheer stress and centrifugal force to a solution comprising a reaction suppressor along with a reactant to allow reaction.

According to the present invention, incomings and outgoings of lithium ions between crystal lattices configuring the lithium titanate nanoparticles will be facilitated by applying sheer stress and centrifugal force to a solution comprising titanium alkoxide and lithium acetate as well as carbon particles in a rotating reactor to allow reaction and production of carbon supporting dispersed lithium titanate nanoparticle precursors, heating this carbon supporting dispersed lithium titanate nanoparticle precursors under nitrogen atmosphere to generate oxygen vacancies in lithium titanate by the reducing action of carbon, and doping these oxygen vacancy sites with nitrogen. As a result, when this composite of lithium titanate nanoparticles supported on carbon is used as the electrode or the electrochemical element, its output property or capacitance can be improved.

In addition, as one aspect of the present invention, the electrochemical capacitor comprises: an electrode containing carbon supporting highly dispersed lithium titanate nanoparticles having oxygen vacancies and doped with nitrogen as the negative electrode, and a polarizable electrode as the positive electrode, and an electrolytic solution including a lithium salt and a quaternary ammonium salt.

According to the above aspect, it is thought that the output property is further improved due to the fact that the oxygen vacancy site becomes the adsorption/desorption site for lithium by employing as the negative electrode an electrode containing carbon supporting highly dispersed lithium titanate nanoparticles having oxygen vacancies and doped with nitrogen, the electric conductivity is increased and the output property is improved by further doping with nitrogen, and the solvate structure of the solvent is altered and the diffusion speed of lithium ions is increased by mixing the lithium salt with a quaternary ammonium salt. An electrochemical capacitor having an output property higher than ever before can be realized by such a configuration.

In addition, as another aspect of the present invention, the electrochemical capacitor comprises: an electrode containing carbon supporting highly dispersed lithium titanate nanoparticles having oxygen vacancies and doped with nitrogen as the negative electrode; a polarizable electrode as the positive electrode; and an electrolytic solution comprising ethylene carbonate and dimethyl carbonate.

According to the above aspect, it is thought that the output property is further improved due to the increase in lithium ion diffusion speed by low viscosity property of the solvent by employing ethylene carbonate and dimethyl carbonate as the solvent. An electrochemical capacitor having an output property higher than ever before is realized by such a configuration, and further, it is thought that high-temperature load property is stabilized due to the fact that a solvent consisting of ethylene carbonate and dimethyl carbonate forms a stable film on the surface of the electrode material.

In addition, as another aspect of the present invention, the electrochemical capacitor comprises: an electrode containing carbon supporting highly dispersed lithium titanate nanoparticles having oxygen vacancies and doped with nitrogen as the negative electrode; a polarizable electrode as the positive electrode; and an electrolytic solution comprising vinylene carbonate.

According to the above aspect, it is thought that the cycle property is improved due to the fact that vinylene carbonate produces a stable film that suppresses the reaction with the electrolytic solution on the surface of the electrode. An electrochemical capacitor having high output property and good cycle property can be realized by such a configuration.

In addition, as another aspect of present invention, the electrochemical capacitor comprises: an electrode containing carbon supporting highly dispersed lithium titanate nanoparticles having oxygen vacancies and doped with nitrogen together with acetylene black as the negative electrode; and a polarizable electrode as the positive electrode.

According to the above aspect, it is thought that the output property is further improved due to the increase in the electric conductivity of the electrode by the action of acetylene black. An electrochemical capacitor having an output property higher than ever before can be realized by such a configuration.

DESCRIPTION OF EMBODIMENTS

Embodiments for implementing the present invention will now be described.
(Mechanochemical Reaction)

The reaction method employed in the present invention is a mechanochemical reaction similar to the method shown in Patent Documents 1 and 2 previously filed for patent application by the present inventors, wherein sheer stress and centrifugal force are applied to a reactant in a rotating reactor during the chemical reaction process to allow promotion of chemical reaction.

Figure 8:
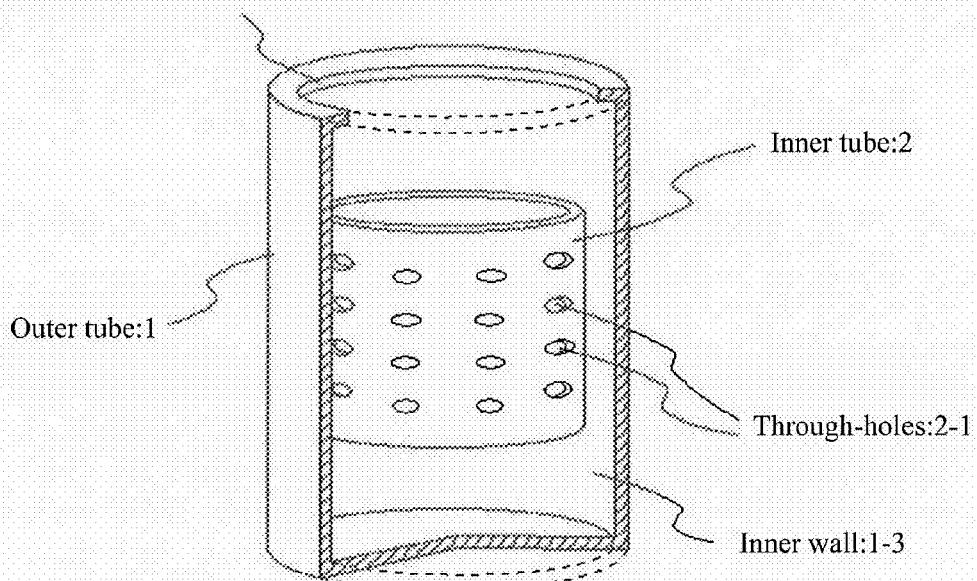
FIG. 8 is a perspective view showing an example of the reactor used in the production method of the present invention.

This reaction method can be performed employing for example the reactor as shown in FIG. 8. As shown in FIG. 8, the reactor consists of an outer tube 1 having a sheathing board 1-2 at the opening and a rotating inner tube 2 having through-holes 2-1. By introducing the reactant into the inner tube of this reactor and rotating the inner tube, the reactant inside the inner tube is transferred through the through-holes of the inner tube to the inner wall 1-3 of the outer tube by its centrifugal force. At this time, the reactant collides with the inner wall of the outer tube by the centrifugal force of the inner tube, and slides up to the upper portion of the inner wall in a thin film state. In this state, the sheer stress with the inner wall and the centrifugal force from the inner tube are both simultaneously applied to the reactant, and a large mechanical energy is thereby applied to the thin film reactant. This mechanical energy is thought to be converted into chemical energy necessary for reaction, the so-called activation energy, and the reaction is progressed in a short period of time.

In this reaction, since the mechanical energy applied to the reactant will be large when in a thin film state, the thickness of the thin film is 5 mm or less, preferably 2.5 mm or less, and further preferably 1.0 mm or less. The thickness of the thin film can be set by the width of the sheathing board and the amount of the reaction solution.

It is thought that this reaction method can be realized by the mechanical energy of sheer stress and centrifugal force applied to the reactant, and this sheer stress and centrifugal force are generated by the centrifugal force applied to the reactant inside the inner tube. Accordingly, the centrifugal force applied to the reactant inside the inner tube necessary for the present invention is 1500 N (kgms$^{-2}$) or higher, preferably 60000 N (kgms$^{-2}$) or higher, and further preferably 270000 N (kgms$^{-2}$) or higher.

In this reaction method, it is thought that chemical reaction can be promoted at a nonconventional speed due to the fact that the mechanical energies of both sheer stress and centrifugal force are simultaneously applied to the reactant and this energy is thereby converted into chemical energy.

(Lithium Titanate)

In order to produce the lithium titanate nanoparticles according to the present invention, for example, a titanium source such as titanium alkoxide, and a lithium source such as lithium acetate, lithium nitrate, lithium carbonate, and lithium hydroxide are used as starting materials, and the lithium titanate nanoparticle precursors are produced by said mechanochemical reaction. The lithium titanate nanoparticles of the present invention having oxygen defect sites doped with nitrogen are produced by heating these lithium titanate nanoparticle precursors under nitrogen atmosphere.

(Carbon)

By adding a given carbon in the reaction process, carbon supporting highly dispersed 5-20 nm lithium titanate can be obtained. In other words, a metal salt and the above reaction suppressor and a given carbon are introduced into the inner tube of the reactor, and the inner tube is rotated to mix and disperse the metal salt and the above reaction suppressor and the carbon. A catalyst such as sodium hydroxide is further introduced while rotating the inner tube to advance hydrolysis and condensation reaction to produce a metal oxide, and this metal oxide and carbon are mixed in a dispersed state. Carbon supporting highly dispersed metal oxide nanoparticles can be formed at the end of the reaction.

The carbon employed here can include Ketjen Black, carbon black such as acetylene black, carbon nanotube, carbon nanohorn, amorphous carbon, carbon fiber, natural graphite, artificial graphite, activated carbon, and mesoporous carbon. A composite thereof can also be employed.

(Solvent)

Alcohols, water, or a mixed solvent thereof can be employed as the solvent. For example, a mixed solvent of acetic acid and lithium acetate dissolved in a mixture of isopropanol and water can be used.

(Reaction Suppressor)

As described in Patent Document 2, a given compound that forms a complex with a given metal alkoxide can be added as the reaction suppressor, wherein said mechanochemical reaction is applied to the metal alkoxide. This can suppress the chemical reaction from being excessively promoted.

In other words, it was found that the reaction can be suppressed and controlled by adding to the metal alkoxide 1-3 moles of a given compound such as acetic acid that forms a complex therewith (relative to 1 mole of the metal alkoxide) to form a complex. Composite nanoparticles of a metal and an oxide, e.g. composite nanoparticles of lithium and titanium oxide which are lithium titanate nanoparticle precursors are produced by this reaction, and lithium titanate crystals are obtained by calcination thereof.

As stated above, it is thought that chemical reaction can be suppressed from being excessively promoted by adding a given compound such as acetic acid as the reaction suppressor because a given compound such as acetic acid forms a stable complex with a metal alkoxide.

A material that can form a complex with a metal alkoxide includes a complexing agent represented by a carboxylic acid such as acetic acid, as well as citric acid, oxalic acid, formic acid, lactic acid, tartaric acid, fumaric acid, succinic acid, propionic acid, and levulinic acid, an amino polycarboxylic acid such as EDTA, and an aminoalcohol such as triethanolamine.

(Heating)

The present invention is thought to be due to a mechanism wherein oxygen defects are generated by heating lithium titanate under nitrogen atmosphere, capacitance and output property are improved by occlusion and desorption of lithium occurring at these sites, and these oxygen defect sites are further doped with nitrogen thereby improving the electric conductivity of lithium titanate and improving the output property.

It was found that in the calcination step of the obtained lithium titanate nanoparticle precursors, crystallization of lithium titanate proceeds well by rapidly heating from room temperature to 700-900° C. Good crystallization progress cannot be attained at below this temperature, and lithium titanate having good energy storage property cannot be obtained due to phase transition at over this temperature.

(Electrode)

The composite of lithium titanate nanoparticles and carbon obtained by the present invention can be mixed and kneaded with a binder, molded, and made into the electrode of an electrochemical element, i.e. electric energy storage electrode. This electrode shows high output property and high capacitance property.

(Electrochemical Element)

An electrochemical element that can employ this electrode is an electrochemical capacitor or battery that employs an electrolytic solution containing lithium ions. In other words, the electrode of the present invention can occlude and detach lithium ions, and works as a negative electrode. Accordingly, an electrochemical capacitor or battery can be configured by employing an electrolytic solution containing lithium ions, and employing as the counter electrode for example activated carbon and metal oxide which occludes and detaches lithium.

The electrochemical capacitor of the present invention is formed by employing an electrode formed as above as the negative electrode, employing a polarizable electrode as the positive electrode, and further employing an electrolytic solution. The electrolytic solution employed is (a) an electrolytic solution comprising a lithium salt and a quaternary ammonium salt, (b) an electrolytic solution comprising ethylene carbonate and dimethyl carbonate, or (c) an electrolytic solution comprising vinylene carbonate.

The negative electrode is formed by mixing the carbon supporting highly dispersed lithium titanate nanoparticles with a binder, mixing and kneading, shaping into a sheet, and juncturing this with a collector. Polyvinylidene fluoride and polytetrafluoroethylene etc. are employed as the binder. Those produced by applying a mixed solution of carbon and binder on a collector by e.g. Doctor Blade method and dried may also be employed. In addition, for the negative electrode, acetylene black in addition to the carbon supporting highly dispersed lithium titanate nanoparticles may be mixed with the binder.

The polarizable electrode employed as the positive electrode is formed by mixing the mixture of activated carbon powder and conductive material with a binder, mixing and kneading, shaping into a sheet, and juncturing this with a collector. Polyvinylidene fluoride and polytetrafluoroethylene etc. are employed as the binder. Those produced by applying a mixed solution of activated carbon powder and conductive material powder and binder on a collector by e.g. Doctor Blade method and dried may also be employed. Examples of an activated carbon include coconut shell, phenol resin, and petroleum coke, and examples of an activated carbon raw material activation method include steam activation method and molten alkali activation method. A conductive material includes conductive carbon black or graphite.

The lithium salt employed for the electrolytic solution can be one or more selected from the group consisting of $LiPF_6$, $LiBF_4$, $LiClO_4$, $LiN(SO_2CF_3)_2$, $LiN(SO_2C_2F_5)_2$, $LiCF_3SO_3$, $LiC(SO_2CF_3)_3$, $CF_3SO_3Li$, and $LiPF_3(C_2F_5)_3$.

Examples the quaternary ammonium salt employed for the electrolytic solution can include tetraethylammonium and tetraethylmethylammonium as a cation, and $BF_4^-$, $PF_6^-$, $ClO_4^-$, $AsF_6^-$, $SbF_6^-$, $AlCl_4^-$, or $RfSO_3^-$, $(RfSO_2)_2N^-$, $RfCO_2^-$ (Rf is a fluoroalkyl group having 1 to 8 carbons) as an anion.

The solvent employed in the electrolytic solution includes the following. These solvents may be used alone, or two or more may be mixed for use. For example, propylene carbonate, propylene carbonate derivative, ethylene carbonate, ethylene carbonate derivative, butylene carbonate, dimethyl carbonate, diethyl carbonate, ethylmethyl carbonate, γ-butyrolactone, 1,3-dioxolane, dimethyl sulfoxide, sulfolane, formamide, dimethylformamide, dimethylacetamide, dioxolane, phosphate triester, maleic anhydride, succinic anhydride, phthalic anhydride, 1,3-propane sultone, 4,5-dihydropyran derivative, nitrobenzene, 1,3-dioxane, 1,4-dioxane, 3-methyl-2-oxazolidinone, 1,2-dimethoxyethane, tetrahydrofuran, 2-methyltetrahydrofuran, tetrahydrofuran derivative, sydnone compound, acetonitrile, nitromethane, alkoxyethane, and toluene can be employed.

EXAMPLES

Example 1

Acetic acid and lithium acetate in amounts of 1.8 moles of acetic acid and 1 mole of lithium acetate relative to 1 mole of titanium alkoxide were dissolved in a mixture of isopropanol and water to prepare a mixed solvent. This mixed solvent together with titanium alkoxide and carbon nanofiber (CNF) were introduced into a rotary reactor, the inner tube was rotated at a centrifugal force of 66,000 N (kgms$^{-2}$) for 5 minutes to form a thin film of the reactant on the inner wall of the outer tube, and sheer stress and centrifugal force were applied to the reactant to allow promotion of chemical reaction, yielding CNF on which highly dispersed lithium titanate nanoparticle precursors are supported. In this case, the amounts of titanium alkoxide and CNF dissolved in the mixed solvent were set so that the composition of the composite obtained was lithium titanate/CNF at a mass ratio (w/w) of 70/30.

By drying the obtained CNF supporting highly dispersed lithium titanate nanoparticle precursors under vacuum at 80° C. for 17 hours, a composite powder in which highly dispersed lithium titanate nanoparticle precursors are supported on CNF was obtained.

The obtained composite powder in which highly dispersed lithium titanate nanoparticle precursors are supported on CNF under was heated under nitrogen atmosphere at 900° C. to allow progression of crystallization of titanium oxide containing lithium, and a composite powder in which highly dispersed lithium titanate nanoparticles are supported on carbon nanofiber was obtained.

Example 2

Heating was at 800° C., instead of under nitrogen atmosphere at 900° C. in said Example 1.

Example 3

Heating was at 700° C., instead of under nitrogen atmosphere at 900° C. in said Example 1.

Comparative Example 1

Heating was under vacuum at 900° C., instead of under nitrogen atmosphere at 900° C. in said Example 1.

Comparative Example 2

Heating was under vacuum at 800° C., instead of under nitrogen atmosphere at 900° C. in said Example 1.

Comparative Example 3

Heating was at under vacuum at 700° C., instead of under nitrogen atmosphere at 900° C. in said Example 1.

Comparative Example 4

Heating was in air (oxidizing atmosphere) at 900° C., instead of under nitrogen atmosphere at 900° C. in said Example 1.

Comparative Example 5

Heating was in argon/hydrogen (reducing atmosphere) at 900° C., instead of under nitrogen atmosphere at 900° C. in said Example 1.

Figure 1:
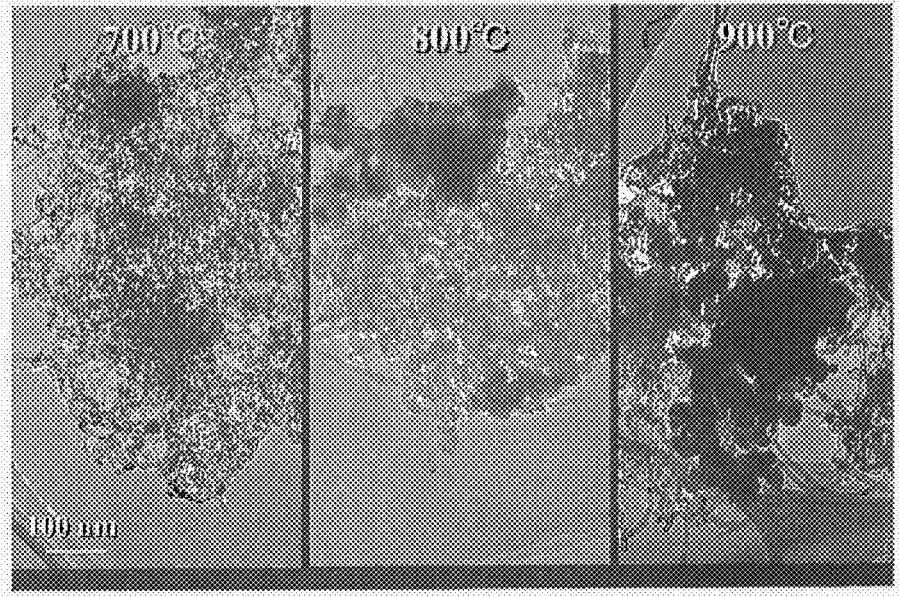
FIG. 1 is a photograph as a substitute for drawing which shows the TEM images of the composites of lithium titanate nanoparticles and carbon of Examples 1 to 3.

The respective TEM images of the carbon supporting lithium titanate nanoparticles of Examples 1 to 3 obtained as above are shown in FIG. 1. In FIG. 1, it is seen that highly dispersed 5 nm-20 nm lithium titanate nanoparticles are supported on carbon nanofiber.

In particular, as seen in the respective TEM images of FIG. 1, "the composite of lithium titanate nanoparticles and carbon" of the present invention takes form of "building blocks for graphite fragment" of CNF connected together, and highly dispersed lithium titanate nanoparticles are supported on this structure.

Figure 7:
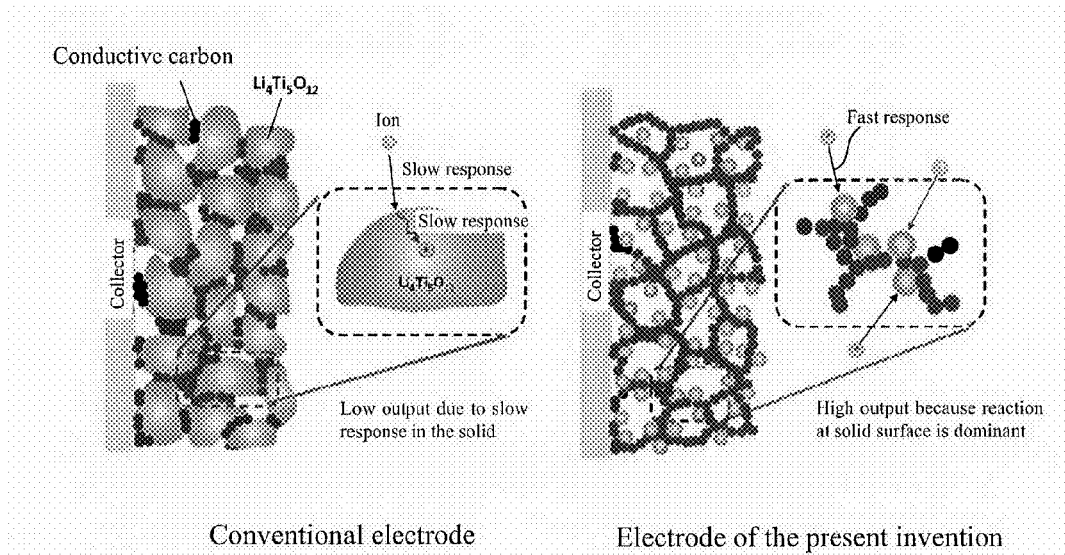
FIG. 7 is a model figure showing the structure of the composite of lithium titanate nanoparticles and carbon of the present invention.

The model figure of this structure is shown in FIG. 7. The conventional electrode of FIG. 7 left has a structure in which carbon is supported on the surface of lithium titanate particles, and lithium titanate particles are junctured by this carbon. Accordingly, output is low due to slow response of lithium ions in the particle. On the other hand, the structure of the present invention of FIG. 7 right has high output because quick response at the surface is dominant due to lithium titanate being in nanoparticulate form. Further, since carbon takes form of building blocks for graphite fragment, electric conductivity is improved, and further the output property is improved.

The Composite powder obtained in Examples 1 to 3 and Comparative Examples 1 to 3 configured as above was introduced into a SUS mesh welded onto a SUS plate together with polyvinylidene fluoride PVDF as the binder ($Li_4Ti_5O_{12}$/CNF/PVDF 56:24:20). This was set as the working electrode W.E. A separator as well as the counter electrode C.E. and Li foil as the reference electrode were placed on said electrode, and 1.0 M lithium tetrafluoroborate ($LiBF_4$)/ethylene carbonate EC:dimethyl carbonate DEC (1:1 w/w) was impregnated as the electrolytic solution to yield a cell.

Figure 2:
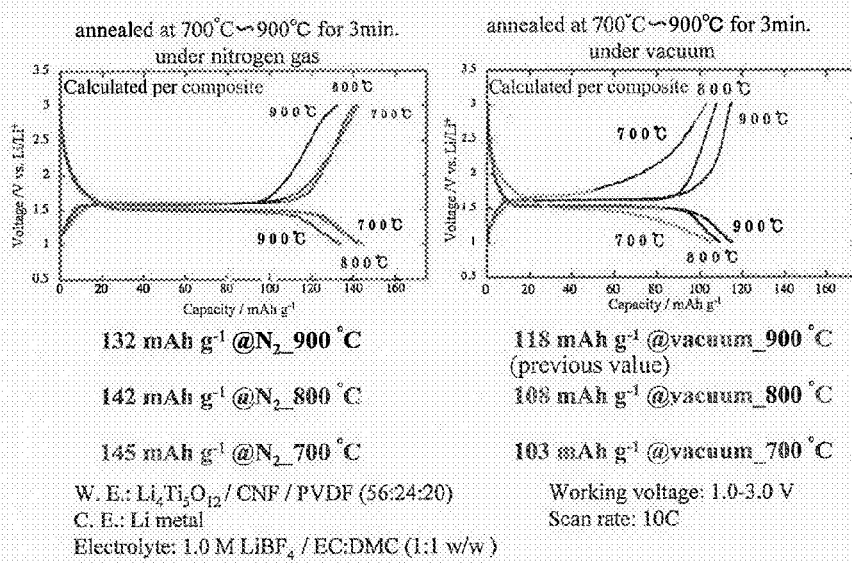
FIG. 2 is graphs showing the discharge behavior property of the composites of lithium titanate nanoparticles and carbon of Examples 1 to 3.
Figure 3:
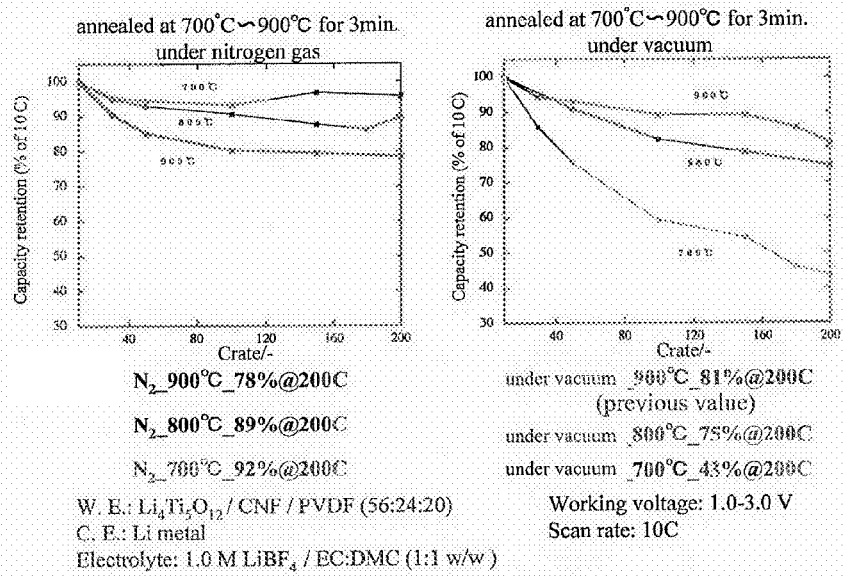
FIG. 3 is graphs showing the output property of the composites of lithium titanate nanoparticles and carbon of Examples 1 to 3.

For a cell having an electrode that employs the composite powder of Examples 1 to 3 and Comparative Examples 1 to 3 obtained as above, the charge and discharge behavior thereof and capacitance calculated based thereon are shown in FIG. 2, and the output property is shown in FIG. 3. In FIGS. 2 and 3, the left graph shows Examples 1 to 3, and the right graph shows Comparative Examples 1 to 3. In this case, the working voltage is 1.0-3.0 V and the scan rate is 10 C. Moreover, the heating time is 3 minutes for each.

As seen from FIG. 2, a cell that uses the composite powder of Examples 1 to 3 heated under nitrogen atmosphere has increased capacitance compared to a cell that uses the composite powder of Comparative Examples 1 to 3 heated under vacuum. In particular, a cell that uses the composite powder of Comparative Example 1 heated under vacuum to 900° C. had the largest capacitance among conventional technology, but the cells of Examples 1 to 3 all had capacitance far greater than that of Comparative Example 1. In particular, as seen from the right graph of FIG. 2, Examples 2 and 3 heated at 700° C. and 800° C. yielded a large capacitance compared to Example 1 heated to 900° C.

FIG. 3 is graphs showing the output property of each cell with C-rate on the horizontal axis and discharge capacitance maintenance rate (%) on the vertical axis. As seen from this FIG. 3, the discharge capacitance maintenance rate when the C-rate is at 200 C is far greater in the cells of Examples 1 to 3 than the cells of Comparative Examples 1 to 3. It should be noted here that the most superior output property is shown at a high temperature of 900° C. in the cells of Comparative Examples 1 to 3 heated under vacuum, whereas superior output property is shown at 700° C. and 800° C. instead of 900° C. in the cells of Examples 1 to 3. Although there was no difference in capacitance or charge and discharge property between Example 2 and 3, the output property was superior at 700° C.

Figure 4:
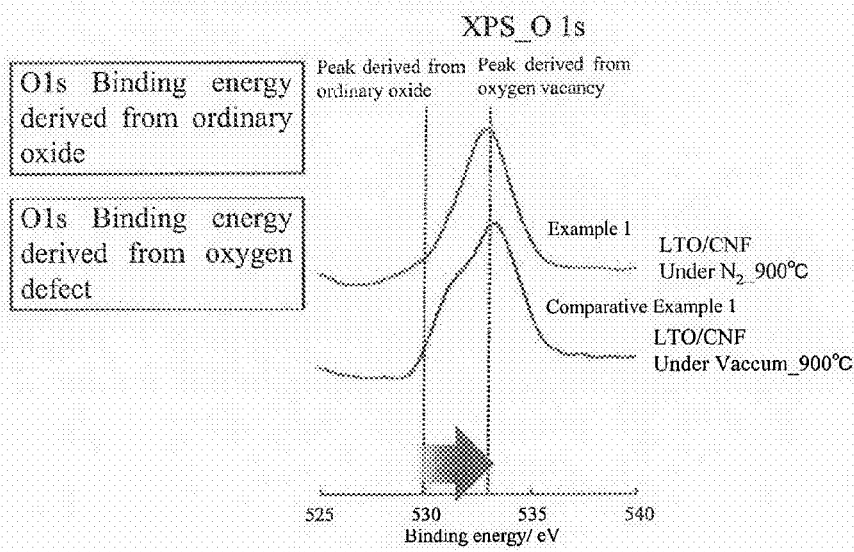
FIG. 4 is a graph showing that oxygen defect spinel structure is present in the composite of lithium titanate nanoparticles and carbon of the present invention.

In order to verify oxygen defects in the composite of the present invention, the XPS_O 1s analysis results for Example 1 and Comparative Examples 1 and 4 are shown in FIG. 4. According to these XPS_O 1s analysis results, O 1s binding energy peak at 533-534 eV showing a spectrum derived from an oxygen defect is confirmed for Example 1, and a binding energy peak at 530 eV showing a spectrum derived from an ordinary oxide is confirmed for Comparative Examples 1 and 4.

Figure 5:
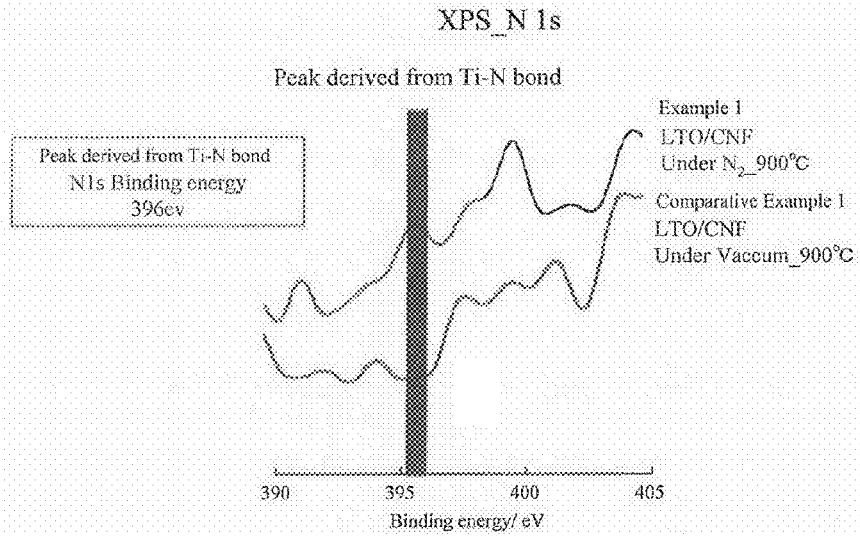
FIG. 5 is a graph showing that a titanium-nitrogen bond is present in the composite of lithium titanate nanoparticles and carbon of the present invention.

In order to verify that Ti—N bond is present by nitrogen doping in the composite of the present invention, the XPS_N 1s analysis results for Example 1 and Comparative Examples 1 and 4 are shown in FIG. 5. According to these XPS_N 1s analysis results, N 1s binding energy peak at 396 eV showing a Ti—N bond is detected for Example 1, confirming nitrogen doping. On the other hand, N is binding energy peak is not confirmed at 369 eV for Comparative Examples 1 and 4, confirming that Ti—N bond is absent, i.e. there is no nitrogen doping. In the composite of Example 1 in which nitrogen doping was confirmed as stated above, the electric conductivity of lithium titanate is improved, and as a result the output property is improved in an electrode or an electrochemical element that employs this composite.

Figure 6:
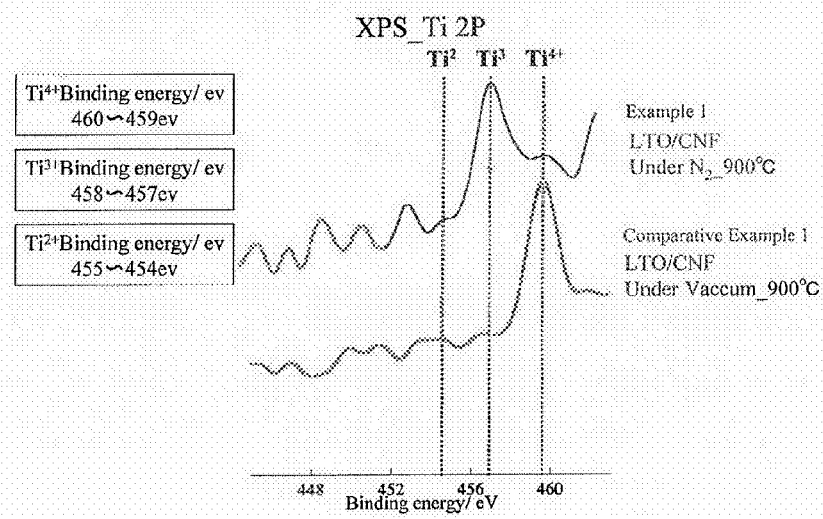
FIG. 6 is a graph showing the change in titanium valence of carbon supporting lithium titanate nanoparticles under each gas atmosphere.

In order to verify that change in Ti valence has occurred in the composite of the present invention, the XPS_Ti 2P analysis results for Example 1 and Comparative Examples 1 and 4 are shown in FIG. 6. According to these XPS_Ti 2P analysis results, Ti 2P binding energy peak at 458-457 eV showing $Ti^3$ is detected for Example 1, confirming that trivalent titanium is present. On the other hand, Ti 2P binding energy peak at 460-459 eV showing $Ti^4$ is detected for Comparative Examples 1 and 4, confirming that tetravalent titanium is present. Meanwhile, Ti 2P binding energy peak at 455-454 eV showing $Ti^2$ is not detected for Example 1 and Comparative Examples 1 and 4, confirming that bivalent titanium is not present.

As stated above, according to the analysis results of FIG. 6, it is seen that with heating under nitrogen atmosphere of the present invention, titanium valence is decreased from tetravalent to trivalent compared to the heating under vacuum. Accordingly, since titanium valence is decreased by oxygen defect, and occlusion and desorption of lithium occurs at these sites, capacitance and output property are improved in an electrode or an electrochemical element that employs the composite of the present invention.

As apparent from comparison of Examples 1 to 3 with Comparative Examples 1 to 3 shown in said FIGS. 2 and 3, in the present invention heated under nitrogen atmosphere, electric property is improved in 700-800° C. of Examples 1 and 2 than 900° C. of Example 3. On the other hand, in the Comparative Examples heated under vacuum, Comparative Example 1 at 900° C. has the best property. This shows that a more superior property is elicited with low-temperature heating when heated under nitrogen atmosphere than under vacuum.

Example 4

Acetic acid and lithium acetate in amounts of 1.8 moles of acetic acid and 1 mole of lithium acetate relative to 1 mole of titanium alkoxide were dissolved in a mixture of isopropanol and water to prepare a mixed solvent. This mixed solvent together with titanium alkoxide, isopropyl alcohol, and carbon nanofiber were introduced into a rotary reactor, the inner tube was rotated at a centrifugal force of 66,000 N ($kgms^{-2}$) for 5 minutes to form a thin film of the reactant on the inner wall of the outer tube, and sheer stress and centrifugal force were applied to the reactant to allow promotion of chemical reaction, yielding Ketjen Black supporting highly dispersed lithium titanate precursor.

By drying the obtained carbon nanofiber supporting highly dispersed lithium titanate precursors under vacuum at 80° C. for 17 hours, a composite powder in which highly dispersed lithium titanate precursors are supported on carbon nanofiber was obtained.

The obtained composite powder in which highly dispersed lithium titanate precursors are supported on carbon nanofiber was rapidly heated under nitrogen atmosphere to 800° C. to allow progression of crystallization of titanium oxide containing lithium, and a composite powder in which highly dispersed lithium titanate nanoparticles are supported on carbon nanofiber was obtained.

Nine parts by weight of the composite powder obtained as the above and 1 part by weight of PVDF (polyvinylidene fluoride) binder were mixed and kneaded, and rolled to form a sheet. After vacuum drying, this sheet was junctured to a copper foil as the negative electrode.

In addition, 8 parts by weight of activated carbon (available from Kuraray Chemical Co., Ltd., YP-17), 1 part by weight of PTFE binder (polytetrafluoroethylene), and 1 part by weight of carbon nanofiber as the conductive material were mixed and kneaded, and rolled to form a sheet. After vacuum drying, this sheet was junctured to an aluminum foil as the positive electrode.

These electrodes were placed facing each other via a cellulose-based separator in a beaker filled with $LiBF_4$ and propylene carbonate solution to prepare a hybrid capacitor cell.

Comparative Example 6

Figure 9:
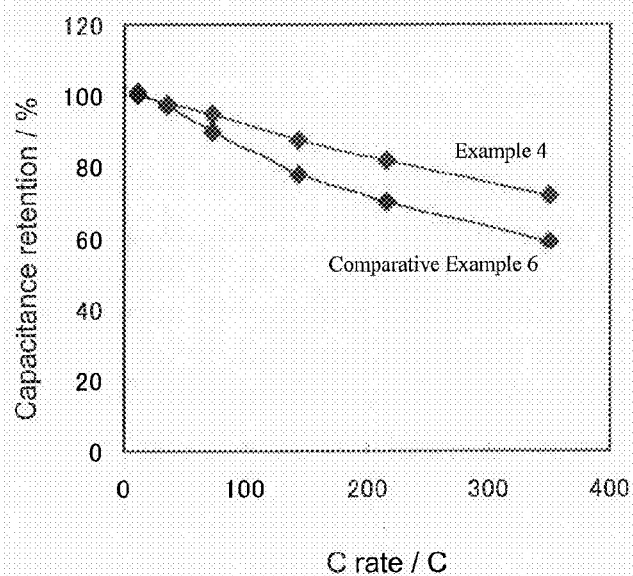
FIG. 9 is a graph showing the charge and discharge test result of Example 4 and Comparative Example 6 of the present invention.

A hybrid capacitor cell was prepared as in Example 4 except that heating was under vacuum. Charge and discharge tests were performed at a constant current for these cells to measure the energy density and power density, and a result as shown in FIG. 9 was obtained. As seen from FIG. 9, the rate property of the hybrid capacitor of Example 4 was better than that of the hybrid capacitor of Comparative Example 6, and the capacitance retention rate at 400 C was 1.25-fold.

Example 5

(Electrode Material 1)

Acetic acid and lithium acetate in amounts of 1.8 moles of acetic acid and 1 mole of lithium acetate relative to 1 mole of titanium alkoxide were dissolved in a mixture of isopropanol and water to prepare a mixed solvent. This mixed solvent together with titanium alkoxide, isopropyl alcohol, and Ketjen Black (available from Ketjen Black International Company, product name: Ketjen Black EC600 JD, porosity 78 vol. %, primary particle size 34 nm, average secondary particle size 337.8 nm) were introduced into a rotary reactor, the inner tube was rotated at a centrifugal force of 66,000 N (kgms$^{-2}$) for 5 minutes to form a thin film of the reactant on the inner wall of the outer tube, and sheer stress and centrifugal force were applied to the reactant to allow promotion of chemical reaction, yielding Ketjen Black supporting highly dispersed lithium titanate precursor.

By drying the obtained Ketjen Black supporting highly dispersed lithium titanate precursors under vacuum at 80° C. for 17 hours, a composite powder in which highly dispersed lithium titanate precursors are supported on Ketjen Black was obtained.

The obtained composite powder in which highly dispersed lithium titanate precursors are supported on Ketjen Black was rapidly heated under nitrogen atmosphere to 800° C. to allow progression of crystallization of titanium oxide containing lithium, and a composite powder in which highly dispersed lithium titanate nanoparticles are supported on Ketjen Black was obtained.

(Electrode Material 2)

By rapid heating under vacuum to 800° C. instead of rapid heating under nitrogen atmosphere to 800° C. in electrode material 1, a composite powder in which highly dispersed lithium titanate nanoparticles are supported on Ketjen Black was similarly obtained.

Figure 10:
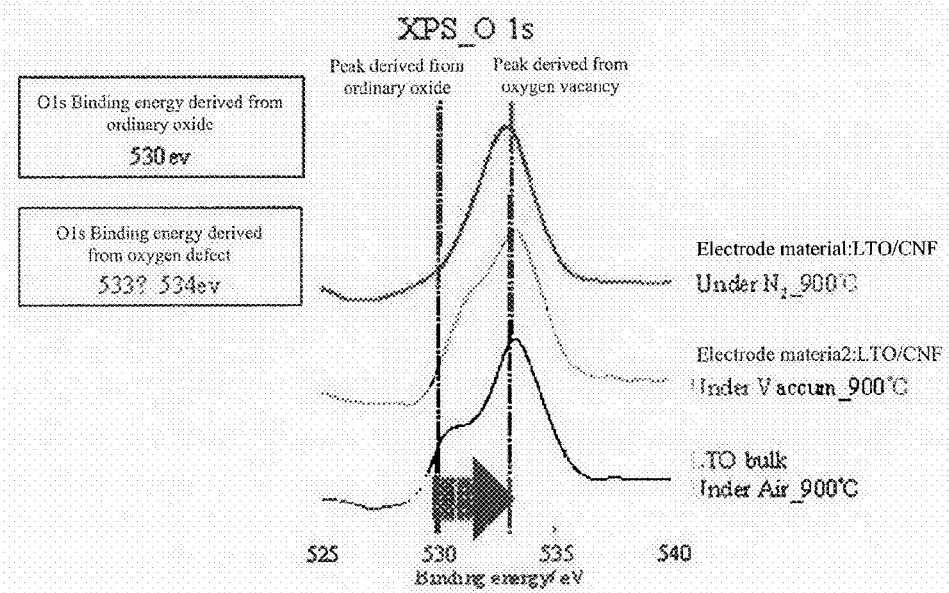
FIG. 10 is a graph showing that oxygen vacancy spinel structure is present in the composite of lithium titanate nanoparticles and carbon of Example 5 of the present invention.
Figure 11:
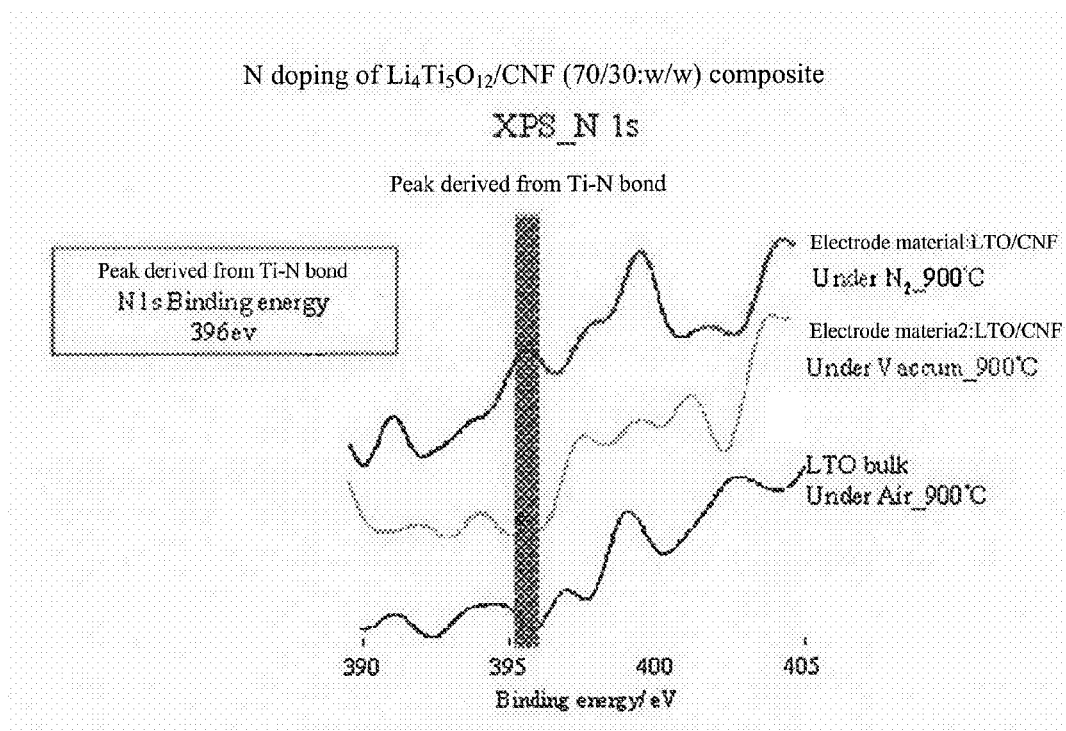
FIG. 11 is a graph showing that a titanium-nitrogen bond is present in the composite of lithium titanate nanoparticles and carbon of Example 5 of the present invention.

The XPS_O 1s and XPS_N 1s analysis results of the above composite powders are shown in FIGS. 10 and 11. The analysis result of a conventional lithium titanate sintered body is also shown. According to these XPS_O 1s analysis results, O 1s binding energy peak at 533-534 eV showing a spectrum derived from an oxygen vacancy is confirmed for electrode material 1, and a binding energy peak at 530 eV showing a spectrum derived from an ordinary oxide is confirmed for electrode material 2. Further, according to these XPS_N 1s analysis results, N 1s binding energy peak at 396 eV showing a Ti—N bond is detected for electrode material 1, confirming nitrogen doping. On the other hand, N1s binding energy peak is not confirmed at 369 eV for electrode material 2, confirming that Ti—N bond is absent, i.e. there is no nitrogen doping.

Nine parts by weight of the electrode material 1 obtained as the above, 1 part by weight of PVDF (polyvinylidene fluoride) binder, and 1 part by weight of carbon nanofiber (available from Showa Denko K.K., VGCF-S) as the conductive material were mixed and kneaded, and rolled to form a sheet. After vacuum drying, this sheet was junctured to a copper foil as the negative electrode.

In addition, 8 parts by weight of activated carbon (available from Kuraray Chemical Co., Ltd., YP-17), 1 part by weight of PTFE binder (polytetrafluoroethylene), and 1 part by weight of Ketjen Black as the conductive material were mixed and kneaded, and rolled to form a sheet. After vacuum drying, this sheet was junctured to an aluminum foil as the positive electrode.

These electrodes were placed facing each other via a cellulose-based separator in a beaker filled with 1 M LiBF$_4$, +0.5 M tetraethylmethylammonium tetrafluoroborate, and propylene carbonate solution as the electrolytic solution to prepare an electrochemical capacitor cell.

Comparative Example 7

An electrochemical capacitor cell was prepared as in the Example except that 1 M LiBF$_4$ and propylene carbonate solution was employed instead of 1 M LiBF$_4$, +0.5 M tetraethylmethylammonium tetrafluoroborate, and propylene carbonate solution as the electrolytic solution in the Example.

Comparative Example 8

An electrochemical capacitor cell was prepared as in Comparative Example 7 except that electrode material 2 was employed instead of electrode material 1 in Comparative Example 7.

Figure 12:
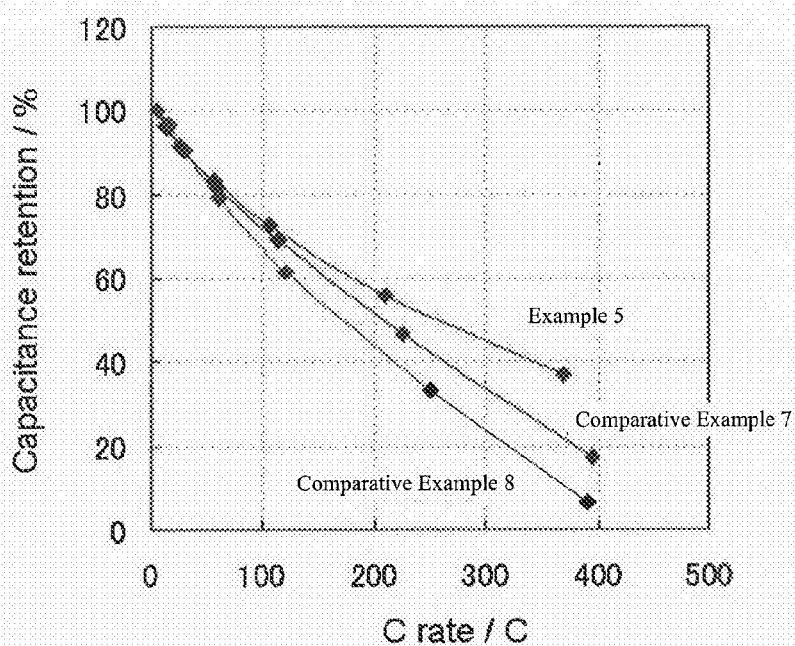
FIG. 12 is a figure showing the rate property of the electrochemical capacitors of Example 5 and Comparative Examples 7 and 8 of the present invention.

The rate property was measured for the above electrochemical capacitor cells. The result is shown in FIG. 12. As shown in FIG. 12, the capacitance maintenance rate of the present Example at 400 C was about 2-fold of Comparative Example 7 and about 4-fold of Comparative Example 8, and the effect of the present Example is apparent.

Example 6

An electrochemical capacitor cell was prepared as in Example 5 except that 1 M LiBF$_4$, 50% ethylene carbonate, and 50% dimethyl carbonate solution were employed as the electrolytic solution.

Figure 13:
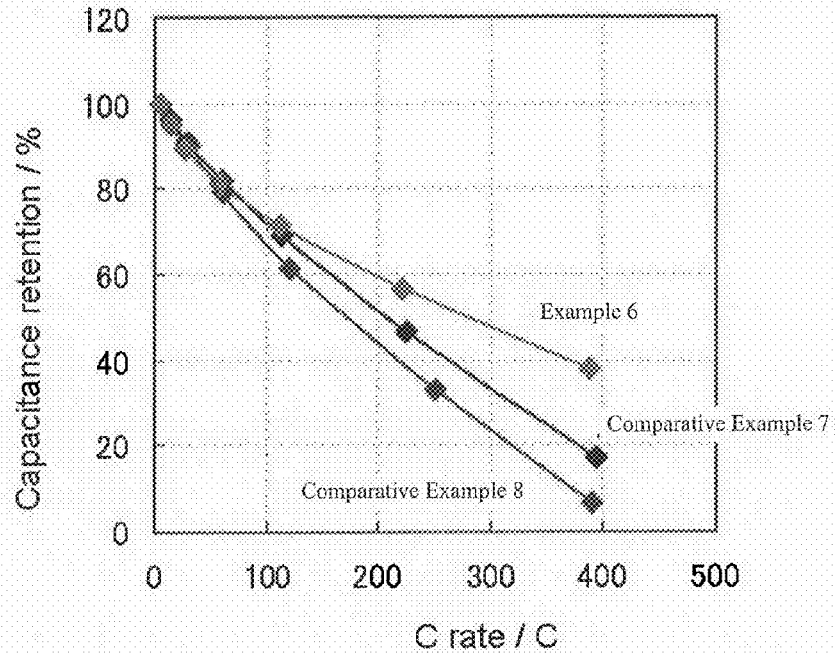
FIG. 13 is a figure showing the rate property of the electrochemical capacitors of Example 6 and Comparative Examples 7 and 8 of the present invention.

The rate property was measured for the electrochemical capacitor cells of Example 6 and Comparative Examples 7 and 8. The result is shown in FIG. 13. As shown in FIG. 13, the capacitance maintenance rate of the present Example at 400 C was about 2-fold of Comparative Example 7 and about 4-fold of Comparative Example 8, and the effect of the present Example is apparent.

Loading tests with 2.9 V at 60° C. and 2.8 V at 85° C. were performed for the electrochemical capacitors of Example 6 and Comparative Example 7. The leakage current after 500 hours and the rate of change of electric capacitance are shown in (Table 1). As seen from Table 1, the leakage current and the rate of change of electric capacitance of the Example are better than the Comparative Example, and good high-temperature load property of the electrochemical capacitor of the present Example is apparent.

TABLE 1

|  | 2.9 V-60° C. | | 2.8 V-85° C. | |
| --- | --- | --- | --- | --- |
|  | LC (μA) | Δcap (%) | LC (μA) | Δcap (%) |
| Example 6 | 1 | −35 | 2 | −20 |
| Comparative Example 7 | 2.5 | −40 | 3 | −30 |

LC: Leakage current,
Δcap: Rate of change of electric capacitance

Example 7

An electrochemical capacitor cell was prepared as in Example 5 except that 1 M $LiBF_4$ containing 1 wt % vinylene carbonate and propylene carbonate solution were employed as the electrolytic solution.

The rate property was measured for the electrochemical capacitor cells of Example 7 and Comparative Examples 7 and 8. The capacitance maintenance rate at 400 C was 20% for the Example and Comparative Example 7, and 10% for Comparative Example 8. Accordingly, the Example has better output property than Comparative Example 8.

Figure 14:
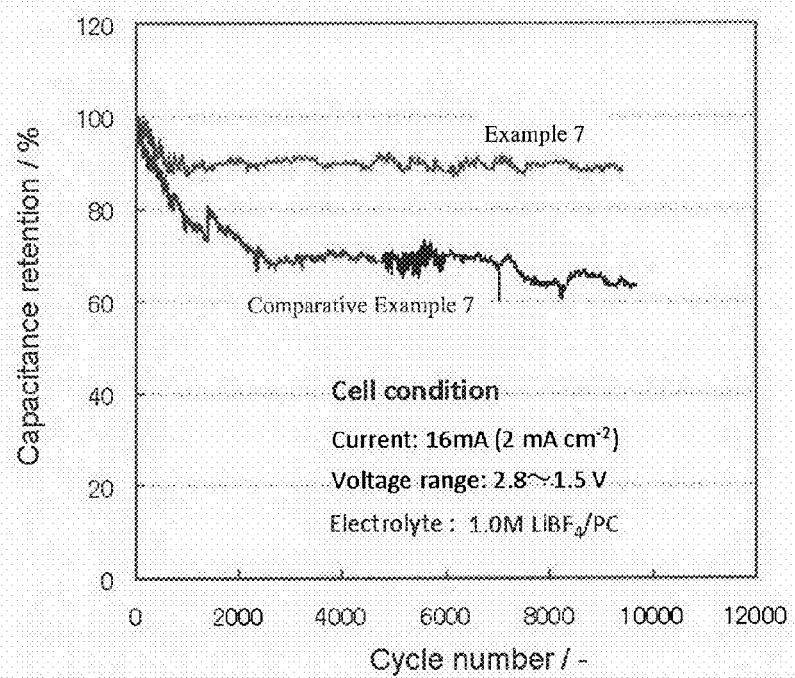
FIG. 14 is a figure showing the cycle property of the electrochemical capacitors of Example 7 and Comparative Example 7 of the present invention.

Subsequently, the cycle property of Example 7 and Comparative Example 7 was performed. The result is shown in FIG. 14. As seen from FIG. 14, Example 7 has better cycle property than Comparative Example 7. Accordingly, the electrochemical capacitor of the present application has good output property as well as good cycle property, and the effect of the present Example is apparent.

Example 8

An electrochemical capacitor cell was prepared as in Example 5 except that 0.5 parts by weight of acetylene black was mixed and kneaded for the sheet that forms the negative electrode, and 1 M $LiBF_4$ and propylene carbonate solution were employed as the electrolytic solution.

The rate property at 80 C was measured for the electrochemical capacitor cells of Example 8 and Comparative Examples 7 and 8. The capacitance maintenance rate was 80% for Example 8, 70% for Comparative Example 7, and 65% for Comparative Example 8. Accordingly, the effect of the present Example is apparent.

The invention claimed is:

1. A composite of lithium titanate nanoparticles and carbon, wherein lithium titanate nanoparticles, crystallized by heating lithium titanate nanoparticle precursors under nitrogen atmosphere, have oxygen vacancies generated by a reducing action of carbon are dispersed and supported by carbon, and said oxygen vacancy sites are doped with nitrogen.

2. The composite of lithium titanate nanoparticles and carbon according to claim 1, produced by applying sheer stress and centrifugal force to a solution comprising a titanium source and a lithium source in a rotating reactor to allow reaction and production of lithium titanate nanoparticle precursors, and heating said precursors under a nitrogen atmosphere.

3. A composite of lithium titanate nanoparticles and carbon according to claim 1, wherein said carbon is a building block for a graphite fragment.

4. The composite of lithium titanate nanoparticles and carbon of claim 3 wherein a carbon nanofiber supports the crystallized lithium titanate nanoparticles with trivalent titanium and oxygen defect sites provided to enable occlusion and absorption of lithium to facilitate electrical charging and discharge properties of the lithium titanate nanoparticles.

5. A composite of crystallized lithium titanate nanoparticles and carbon nanofibers to enable charging and discharging of an electrical charge, comprising:
the crystallized lithium titanate nanoparticles have oxygen defect sites and trivalent titanium nanoparticles that are dispersed to enable surface contact on the carbon nanofibers, nitrogen is doped onto oxygen defect sites to enable occlusion and absorption of lithium to facilitate electrical charging and discharging of the lithium titanate nanoparticles.

\* \* \* \* \*